US010714275B2

(12) United States Patent
Geist et al.

(10) Patent No.: US 10,714,275 B2
(45) Date of Patent: Jul. 14, 2020

(54) ILLUMINATED VISIBLE BREAK

(71) Applicant: Eaton Intelligent Power Limited, Dublin (IE)

(72) Inventors: Laurence James Geist, Mukwonago, WI (US); Joseph Allen Carmichael, Burlington, WI (US); Matthew Stephen Weidemeier, Oconomowoc, WI (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 16/364,289

(22) Filed: Mar. 26, 2019

(65) Prior Publication Data

US 2019/0318887 A1    Oct. 17, 2019

Related U.S. Application Data

(60) Provisional application No. 62/694,608, filed on Jul. 6, 2018, provisional application No. 62/659,006, filed on Apr. 17, 2018.

(51) Int. Cl.
*H01H 9/02* (2006.01)
*G02B 6/00* (2006.01)
(Continued)

(52) U.S. Cl.
CPC ............. *H01H 9/02* (2013.01); *G02B 6/0055* (2013.01); *H01H 9/26* (2013.01); *H02B 1/06* (2013.01);
(Continued)

(58) Field of Classification Search
CPC .... G02B 6/4292; G02B 6/3895; G02B 6/264; G02B 6/262; G02B 6/3897; G02B 6/4298;
(Continued)

(56) References Cited

U.S. PATENT DOCUMENTS 3,966,297 A    6/1976  Delle-Alsthom
6,501,572 B1   12/2002 Poth et al.
(Continued)

FOREIGN PATENT DOCUMENTS

CN    101871594 A    10/2010
CN    203456742 U    2/2014
(Continued)

OTHER PUBLICATIONS

Thierry Starck, European International Searching Authority, International Search Report and Written Opinion, counterpart PCT Application No. PCT/EP2019/025102 dated Jul. 12, 2019, 16 pages total.
(Continued)

*Primary Examiner* — Adam B Dravininkas
(74) *Attorney, Agent, or Firm* — DiBerardino McGovern IP Group LLC (57) ABSTRACT

An assembly for use in an electrical power distribution system includes a housing that includes an interior space; an electrical apparatus in the interior space, the electrical apparatus including an electrical connection mechanism that is configured to move between at least two positions; an observation port through the housing, the observation port being configured to allow visual observation of the electrical connection mechanism in the interior space from an exterior of the housing; and an optical guide between the interior space and a light source. The light source is outside of the interior space and the optical guide is configured to deliver light from the light source to the interior space when the light source emits light.

21 Claims, 9 Drawing Sheets

(51) Int. Cl.
*H02B 1/06* (2006.01)
*F21V 8/00* (2006.01)
*H01H 9/26* (2006.01)
*H05B 47/10* (2020.01)

(52) U.S. Cl.
CPC ..... *H05B 47/10* (2020.01); *H01H 2009/0292* (2013.01)

(58) Field of Classification Search
CPC .. G02B 6/4415; G02B 6/4416; G02B 6/4429; G02B 2006/4297; H01H 2300/03; H01H 83/12; H01H 9/167; H01H 85/30; H01H 1/20; H01H 2009/0292; H01H 9/02; H02B 11/10; H02B 11/127; H02B 13/02; H02B 13/025; H02B 1/00; H02B 3/00; H02B 1/06; H02B 1/306
See application file for complete search history.

(56) References Cited

U.S. PATENT DOCUMENTS

| | | | |
|---|---|---|---|
| 7,310,221 B2 | 12/2007 | Lammers | |
| 8,975,545 B2* | 3/2015 | Smith | H01H 77/00 200/310 |
| 9,336,963 B1 | 5/2016 | Pearce | |
| 9,754,738 B2 | 9/2017 | Faulkner et al. | |
| 10,276,318 B1 | 4/2019 | Schafer | |
| 2001/0025829 A1* | 10/2001 | Marin-Pache | H01H 33/666 218/118 |
| 2009/0015991 A1* | 1/2009 | Hyrenbach | H02B 13/045 361/612 |
| 2010/0149815 A1* | 6/2010 | Erchak | F21S 2/00 362/293 |
| 2010/0150573 A1* | 6/2010 | Furuyama | G02B 6/3895 398/142 |
| 2011/0189887 A1* | 8/2011 | Borgstrom | H01R 3/00 439/488 |
| 2011/0299228 A1* | 12/2011 | Milovac | H02B 13/02 361/614 |
| 2015/0372478 A1* | 12/2015 | Zhou | H02B 5/048 361/93.8 |
| 2016/0126029 A1* | 5/2016 | Faulkner | H02B 11/00 200/50.02 |
| 2016/0134088 A1* | 5/2016 | Faulkner | H02B 1/28 361/605 |
| 2017/0271099 A1* | 9/2017 | Faulkner | H02B 11/00 |
| 2018/0172942 A1* | 6/2018 | Bauco | G02B 6/3873 |

FOREIGN PATENT DOCUMENTS

| | | |
|---|---|---|
| CN | 107170625 A | 9/2017 |
| DE | 202014104584 U1 | 11/2014 |
| EP | 2506277 A2 | 10/2012 |

OTHER PUBLICATIONS

"Visible-Break switch accessory operation instructions," Padmounted switchgear, MN285011EN, Effective May 2017, Supersedes Nov. 2004 (S285-10-4), Cooper Power Series, 12 total pages.

Trident, "Automated Solid Dielectric Switchgear Catalog," https://www.gwelec.com/tridentsrwithsafevu, Jan. 2018, 24 total pages.

* cited by examiner

ILLUMINATED VISIBLE BREAK

CROSS-REFERENCE TO RELATED APPLICATIONS

This application claims the benefit of U.S. Application No. 62/659,006, filed on Apr. 17, 2018 and titled ILLUMINATED VISIBLE BREAK, which is incorporated herein by reference in its entirety; and U.S. Application No. 62/694,608, filed on Jul. 6, 2018 and titled ILLUMINATED VISIBLE BREAK, which is incorporated herein by reference in its entirety.

TECHNICAL FIELD

This disclosure relates to an illuminated visible break.

BACKGROUND

Switchgear may be used in an electrical power distribution network. The switchgear is positioned between a power source and a load or loads that receive electricity from the power source. Under normal operating conditions, the switchgear is closed, and electrical current flows through the switchgear to the load or loads. Switchgear include switching and/or protective devices, such as switches, fuses, fault interrupters, and/or circuit breakers. In response to a detection of a fault condition and/or in response to manual action by an operator, the switchgear opens to prevent current from flowing to the load or loads. A switchgear may be pad-mounted, and a human operator may be able to stand in front of the switchgear for observation of the interior of the switchgear and/or to perform maintenance on the switchgear or components connected to the switchgear.

SUMMARY

In one general aspect, an assembly for use in an electrical power distribution system includes a housing that includes an interior space; an electrical apparatus in the interior space, the electrical apparatus including an electrical connection mechanism that is configured to move between at least two positions; an observation port through the housing, the observation port being configured to allow visual observation of the electrical connection mechanism in the interior space from an exterior of the housing; and an optical guide between the interior space and a light source. The light source is outside of the interior space and the optical guide is configured to deliver light from the light source to the interior space when the light source emits light.

Implementations may include one or more of the following features. The assembly also may include a control panel, the control panel including a control switch configured to control an amount of light emitted from the light source. The control panel may be at the exterior of the housing, and the control panel may include the light source. The housing may include one or more additional interior spaces, and the light source may be in one of the additional interior spaces. The light source may be separate and distinct from the assembly and the housing. The separate and distinct light source may be, for example, a light source configured to be manipulated by a human operator.

An exterior of the electrical connection mechanism may include a material that emits light in response to receiving light from the light source.

The electrical connection mechanism may include at least two electrical contacts, the at least two electrical contacts including a movable contact and a stationary contact. In some implementations, the electrical connection mechanism includes at least a first stationary contact and a second stationary contact, the movable contact is configured to move between the first stationary contact and the second stationary contact, and one of the first stationary contact or the second stationary contact is a service contact and the other of the first stationary contact or the second stationary contact is a ground contact.

The housing may enclose a solid dielectric switchgear.

The optical guide may include an optical fiber or a flexible pipe configured to pass light through an interior region of the flexible pipe.

The optical guide may include a rigid structure that defines an open region configured to pass light.

In another general aspect, an assembly for use in an electrical power distribution system includes a housing including an interior space; an electrical apparatus in the interior space, the electrical apparatus including an electrical connection mechanism configured to move between at least two positions; and an observation port through the housing, the observation port being configured to allow visual observation of the electrical connection mechanism in the interior space from an exterior of the housing. An exterior surface of the electrical connection mechanism includes a material that emits light in response to receiving light from a light source, the material being configured to emit light after receiving light from the light source and while the light from the light source is not illuminating the material.

Implementations may include one or more of the following features. The assembly may include an illumination port through the housing. The illumination port may be separate from the observation port, and the illumination port may be configured to deliver light from the light source into the interior space.

In another general aspect, an assembly for use in an electrical power distribution system includes a housing that includes a plurality of distinct interior spaces, each of the distinct interior spaces enclosing an electrical connection mechanism; an electrical apparatus in each of the distinct interior spaces, the electrical apparatus including an electrical connection mechanism configured to move between at least two positions; an illumination port through the housing; an optical source mounted in the illumination port; an optical guide assembly mounted in the illumination port, the optical guide assembly including: a plurality of optical guides, each optical guide including a first end and a second end, the first end of each of the optical guides being configured to receive light from the optical source and the second end of the optical guide being configured to deliver at least some of the received light to one of the distinct interior spaces; and a plurality of observation ports through the housing, each of the plurality of observation ports being configured to allow visual observation of the electrical connection mechanism in one of the plurality of distinct interior spaces from an exterior of the housing. The observation ports are physically separate from the illumination port.

In some implementations, an exterior surface of the electrical connection mechanism includes a material that reflects or emits light in response to receiving light from a light source. Implementations of any of the techniques described herein may include an assembly that encloses an electrical apparatus, a system, an optical guide assembly, a method of illuminating a visible break, and/or a kit for retrofitting an existing assembly. The details of one or more implementations are set forth in the accompanying drawings and the description below. Other features will be apparent from the description and drawings, and from the claims.

DETAILED DESCRIPTION

Figure 1A:
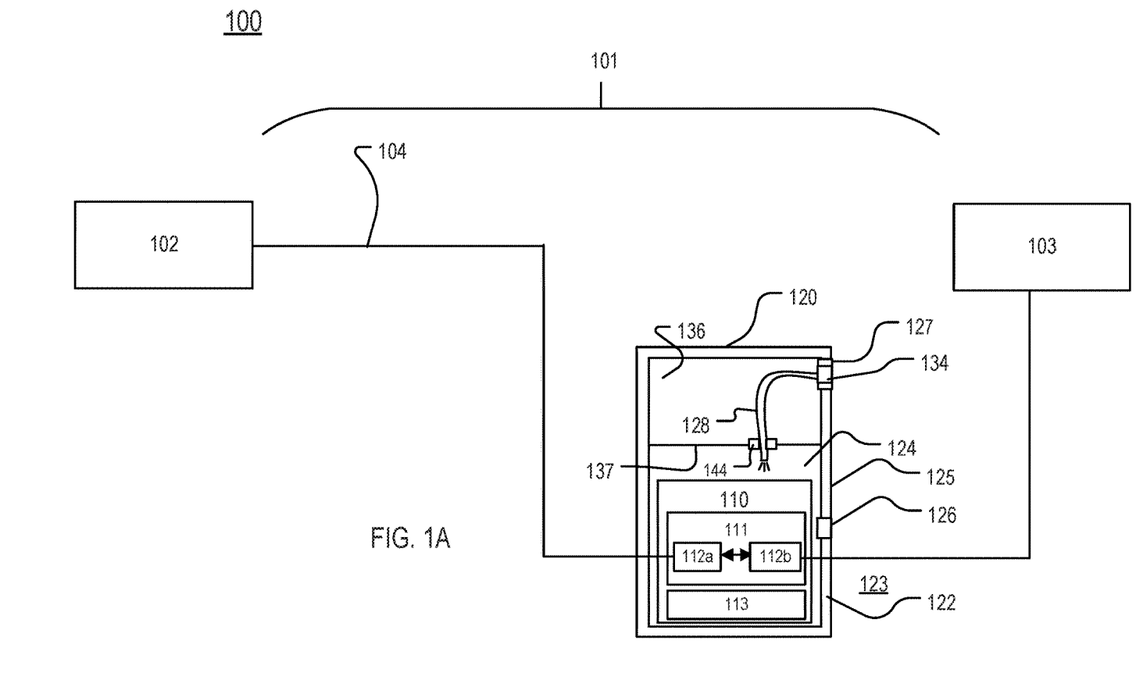
FIG. 1A is a block diagram of an example of an electrical power system.

FIG. 1A is a block diagram of an example of an electrical power system 100. The electrical power system 100 includes an electrical power distribution network 101 that transfers electricity from a power source 102 to electrical loads 103 through a distribution path 104 and an electrical apparatus 110. The electrical power distribution network 101 may be, for example, an electrical grid, an electrical system, or a multi-phase electrical network that provides electricity to commercial and/or residential customers. The electrical power distribution network 101 may have an operating voltage of, for example, at least 1 kilovolt (kV), 12 kV, up to 34.5 kV, up to 38 kV, or 69 kV or higher, and may operate at a fundamental frequency of, for example, 50-60 Hertz (Hz). The distribution path 104 may include, for example, one or more transmission lines, electrical cables, and/or any other mechanism for transmitting electricity.

The electrical apparatus 110 is enclosed in an interior space 124 of an assembly 120. The assembly 120 includes a housing 122, which defines the interior space 124. The housing 122 provides a protective environment for the electrical apparatus 110. The housing 122 may be made from any rigid and rugged material that protects the interior space 124 from moisture and object intrusion. The interior space 124 is closed off (for example, fluidly sealed) from an exterior region 123.

The electrical apparatus 110 is a switchgear, such as a padmounted device (for example, a padmounted fault interrupter or switch), a vault device, a recloser or a voltage regulator, a transformer, or any other device that is capable of controlling and/or monitoring the flow of electricity on the distribution path 104. The electrical apparatus 110 includes a moving electrical connection mechanism 111. In the example of FIG. 1A, the mechanism 111 includes electrical contacts 112a, 112b, which physically connect to allow electricity to flow in the distribution path 104 and disconnect to prevent the flow of electricity in the distribution path 104.

One of the electrical contacts 112a, 112b may be a stationary electrical contact. For example, the mechanism 111 may be a knife-style switch in which the electrical contact 112b is a blade connected at only one end such that the blade is able to move through an arc relative to the electrical contact 112a, which remains stationary in this example. FIGS. 4A-4D, 5D-5F, and 6 show examples in which the mechanism 111 is a knife-style switch. In some implementations, the mechanism 111 is a sliding type switch in which one of the electrical contacts 112a, 112b slides relative to the other of the electrical contacts 112a, 112b. In yet another example, the electrical contacts 112a, 112b may be butt contacts that make contact with each other by pressing the surfaces together. FIGS. 3B, 3C, 5B, and 5C show examples that include butt contacts. The foregoing are provided as examples of the mechanism 111; however, the mechanism 111 may include any configuration of electrical connection that has at least one moving or movable component. Moreover, although the example of FIG. 1A shows two electrical contacts, more than two electrical contacts may be included in the mechanism 111. For example, the mechanism may include one moving electrical contact and more than one stationary contact that is configured to receive the moving electrical contact.

Figure 4A:
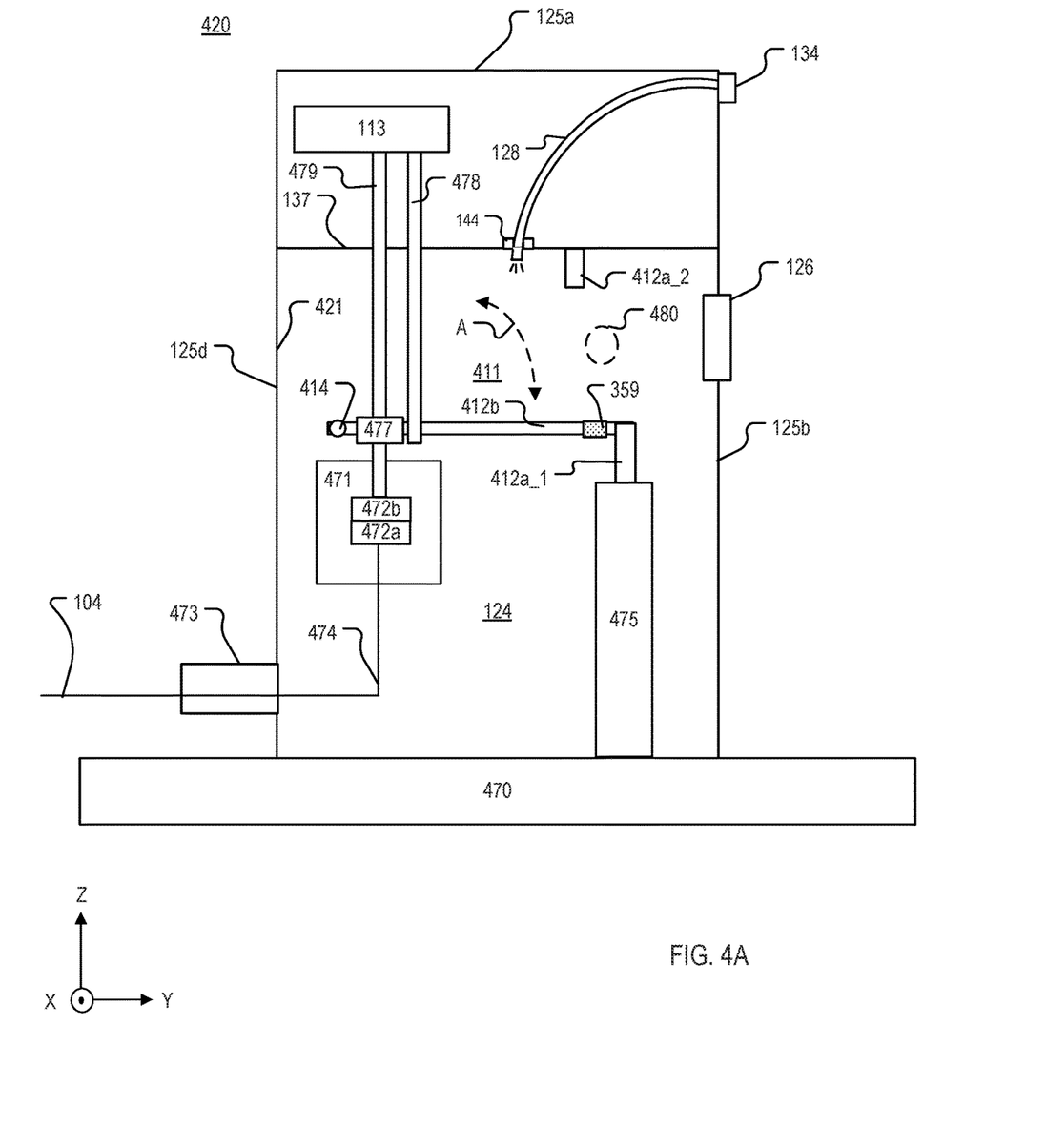
FIG. 4A is a side view of another example of an assembly that encloses an electrical connection mechanism.

A driving apparatus 113 controls the position of the mechanism 111 by, for example, causing either or both of electrical contacts 112a, 112b to move. The driving apparatus 113 includes various manual, electrical, mechanical, and/or electro-mechanical devices (such as, for example, coils and/or motors) that control the position of either or both of the electrical contacts 112a, 112b. The electrical apparatus 110 may include a vacuum interrupter or a circuit breaking mechanism electrically connected to the source 102 and to the contact 112a such that the vacuum interrupter or circuit breaking mechanism is in series with the electrical connection mechanism 111. FIG. 4A shows an example of such a configuration.

In the example of FIG. 1A, the contacts 112a and 112b are connected (placed in physical contact) to allow electricity to flow to the load 103 and disconnected (separated from each other) to stop the flow of electricity to the load 103. The contacts 112a and 112b are separated prior to performing service or maintenance on the electrical apparatus 110, another electrical component in the assembly 120, and/or another electrical component in the electrical power system 100. For safety reasons, it is important that an operator know the position of the contact 112a and/or the contact 112b to ensure, for example, that the contacts 112a and 112b are actually separated prior to attempting to perform service or maintenance. However, the interior space 124 is dark due to being within the housing 122. As discussed in greater detail below, the interior space 124 is illuminated to improve the ability of the operator to view the contacts 112a and 112b.

Figure 1B:
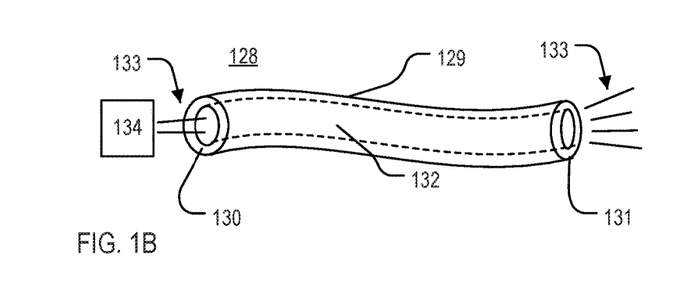
FIG. 1B is a perspective view of an example of an optical guide.
Figure 1C:
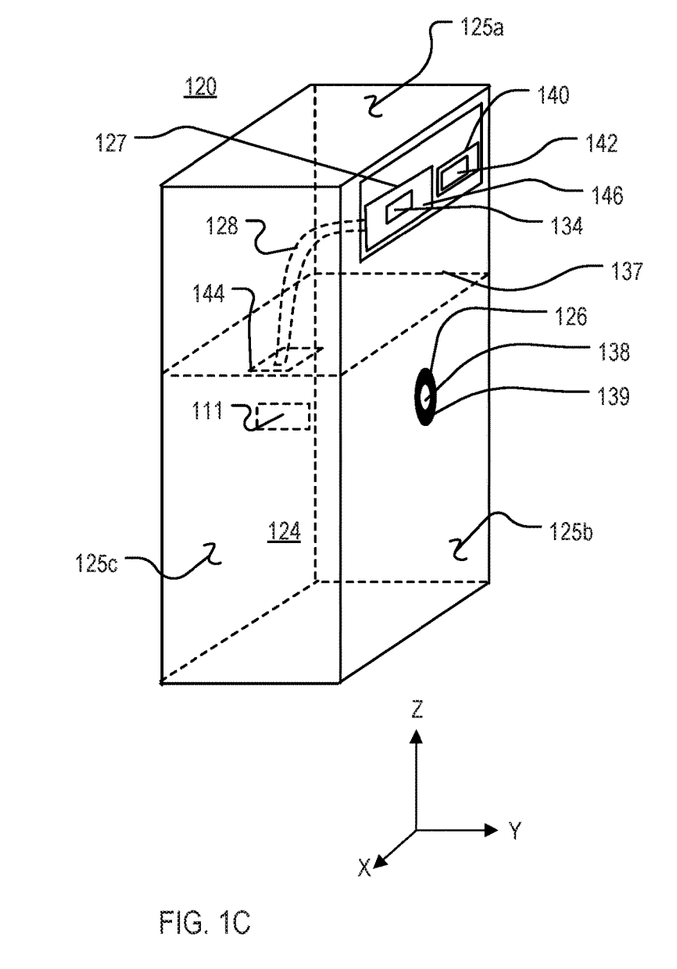
FIG. 1C is a perspective view of an example assembly that encloses an electrical connection mechanism.

The assembly 120 also includes an observation port 126, which allows for visual observation of the interior space 124, and an optical guide 128. The observation port 126 is an opening that passes through the housing 122 from an exterior surface 125 to the interior space 124. The observation port 126 is completely covered with a window 138 (FIG. 1C). The window 138 is made from any visually transparent material, such plastic or glass and is sealed to the housing 122 with a seal 139 (FIG. 1C), such as a gasket or O-ring seal. Thus, the observation port 126 allows an observer (for example, a human operator or a camera) to visually observe the interior space 124 and the contacts 112a, 112b while also maintaining the integrity of the housing 122. Because the position of the contact 112a and/or the contact 112b indicates the status of the mechanism 111 and the electrical apparatus 110, visually observing the position of the contact 112a and/or the contact 112b allows the operator to determine with certainty that it is safe to perform maintenance or service.

To allow observation of the interior space 124 through the observation port 126, light is delivered from a point outside of the interior space 124 to the interior space 124 via the optical guide 128. FIG. 1B shows a perspective view of the optical guide 128. The optical guide 128 includes a sidewall 129 that extends from a first end 130 of the optical guide 128 to a second end 131 of the optical guide 128. The sidewall 129 defines an interior region 132. The region 132 may be an open space, or the region 132 may include one or more items. For example, the region 132 may include a bundle of optical fibers. In some implementations, the region 132 is filled with an optically transmissive polymer, such as silicone rubber.

In FIG. 1B, the portion of the region 132 between the ends 130, 131 is illustrated with dashed lines to indicate that it is within the sidewall 129. The region 132 passes from the first end 130 to the second end 131 such that light 133 from a light source 134 at or near the first end 130 propagates through the region 132 to the second end 131. In the example shown in FIG. 1B, the optical guide 128 forms a non-straight optical path that includes curved portions. The optical path is a spatial extent or path along which light travels between the end 130 and the end 131. The optical guide 128 has an elliptical cross-section in a plane that is perpendicular to the optical path at any point between the end 130 and the end 131. Furthermore, the spatial extent of the optical guide 128 from the end 130 to the end 131 is greater than the greatest extent of the cross-section of the optical guide 128. In other words, the optical guide 128 is longer than it is wide.

The optical guide 128 shown in FIG. 1B is provided as an example, and other implementations of the optical guide 128 are possible. The optical guide 128 may be any structure that is capable of transporting the light 133. For example, the optical guide 128 may be a flexible hollow structure such as fiber optic or a flexible pipe. In some implementations, the optical guide 128 is a rigid structure that includes reflective elements (such as mirrors) to guide the light 133 from the first end 130 to the second end 131. The curved optical path formed by the optical guide 128 shown in FIG. 1B is an example of an optical path that is not a straight line between the end 130 and the end 131. However, other optical paths that are not straight lines between the end 130 and the end 131 are possible. For example, in implementations in which the optical guide 128 is a rigid structure that includes reflective elements, the optical path 128 may include right angles with segments that are straight lines but extend along different directions. Moreover, the optical guide 128 may form an optical path that is a straight line between the end 130 and the end 131. In some implementations, the optical guide 128 has a circular cross-section.

The light source 134 may be any device that emits light. For example, the light source 134 may be a light-emitting diode (LED), a lamp, or a light bulb. In the example of FIG. 1A, the light source 134 is fixed to the housing 122 at an illumination port 127. However, the light source 134 may be arranged in another manner. For example, the light source 134 may be separate and distinct from the housing 122 and the assembly 120. In these implementations, the light source 134 may be a flashlight or headlamp that is placed at the illumination port 127 by a human operator. In still other implementations, the light source 134 is inside the housing 122 but in another compartment of the housing 122 (such as a compartment 136) that is separated by an opaque barrier 137 from the interior space 124. Moreover, the illumination port 127 is substantially free of baffles or other structures that act to block light. Thus, the light source 134 may be ambient light that passes through the illumination port 127 without the direct intervention of the operator.

The assembly 120 is a three-dimensional body. FIG. 1C shows a perspective view of the assembly 120. In FIG. 1C, the dashed lines represent elements that are hidden within the assembly 120. The assembly 120 is a parallelepiped. That is, the assembly 120 is a three-dimensional body, and the exterior surface 125 includes six exterior sides, each of which is a parallelogram. However, in other implementations, the assembly 120 may have a shape other than a parallelepiped. In FIG. 1C, three of the six exterior sides of the housing 122 are labeled: sides 125a, 125b, and 125c. The side 125a is the top of the housing 122, and the sides 125b and 125c are two of the four exterior sidewalls of the housing 122. In the example of FIG. 1C, the side 125b is the front of the housing 122. The interior space 124 is enclosed by the sides 125b, 125c, the barrier 137, and sides that are opposite to the sides 125a, 125b, 125c. The illumination port 127 and the observation port 126 are at the front 125b but are separated from each other along the Z direction. In other words, the illumination port 127 and the observation port 126 are at different locations on the front 125b.

The assembly 120 includes a control panel 140 that is mounted on the front 125b of the housing 122. The control panel 140 includes a switch and/or dimmer 142 that allows an operator to control how much light is emitted from the light source 134, thus allowing the operator to control how much light enters the optical guide 128.

Figure 1D:
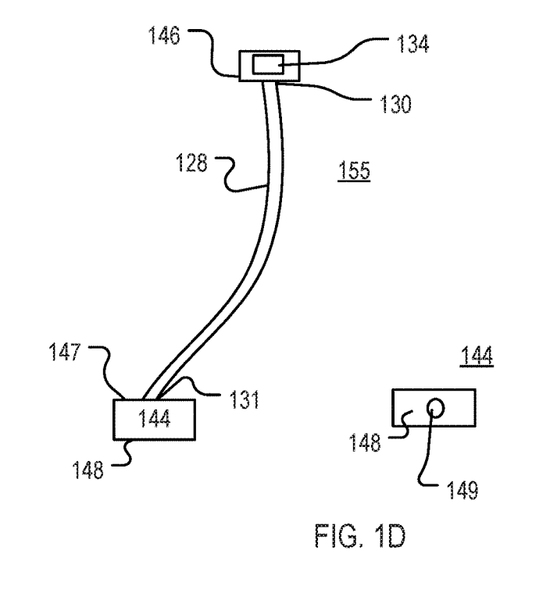
FIG. 1D is a block diagram of the optical guide of FIG. 1B connected to an example of a sealing member and an example of a mounting device.

FIG. 1D is a block diagram of the optical guide 128 connected to a sealing member 144 and a mounting device 146. Together, the optical guide 128, the sealing member 144, and the mounting device 146 form an optical guide assembly 155. The first end 130 of the optical guide 128 is connected to the mounting device 146, which also holds the light source 134. The mounting device 146 is any combination of mechanical and/or optical elements that are capable of holding the optical guide 128 and directing light from the light source 134 into the optical guide 128. The mounting device 146 may include, for example, a set of fiber optic coupling devices that align the region 132 of the optical guide 128 and/or an item or items within the region 132 with the light source 134 such that light emitted from the light source 134 is efficiently coupled into the region 132 and/or an item or item(s) in the region 132. In some implementations (including the implementation shown in FIGS. 1A and 1C), the mounting device 146 also mounts to the housing 122 at the illumination port 127.

The second end 131 of the optical guide 128 is connected to the sealing member 144. The sealing member 144 allows light from the optical guide 128 to enter into the interior space 124 while also sealing the interior space 124. The sealing member 144 defines an opening 149 that passes through the sealing member 144 from a side 147 to a side 148. In the example of FIGS. 1A and 1B, the sealing member 144 is part of the barrier 137, and the side 148 of the sealing member 144 faces the interior space 124. The optical guide 128 is inserted into the opening 149 from the side 147, and the sidewall 129 of the optical guide 128 is sealed to the opening 149. In this way, light emitted from the second end 131 of the optical guide 128 is able to pass through the sealing member 144 and into the interior space 124. In some implementations, the optical guide 128 passes all the way through the opening 149 such that the second end 131 of the optical guide 128 is in the interior space 124.

Figure 2A:
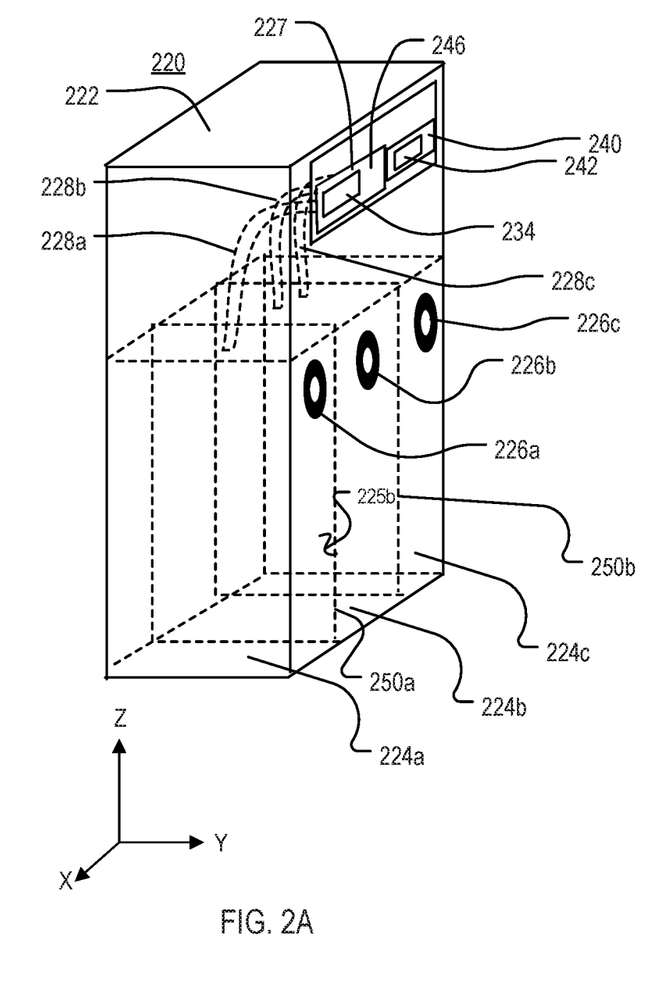
FIG. 2A is a perspective view of another example of an assembly that encloses an electrical connection mechanism.

FIG. 2A is a perspective view of an assembly 220. In FIG. 2A, dashed lines are used to indicate hidden elements that are inside the assembly 220. The assembly 220 is an example of an implementation of the assembly 120 (FIG. 1A). The assembly 220 may be used in the power system 100. The assembly 220 is similar to the assembly 120, except the assembly 220 has an interior space that is divided into three compartments: 224a, 224b, 224c. The compartments 224a and 224b are separated by an opaque barrier 250a, and the compartments 224b and 224c are separated by an opaque barrier 250b. The opaque barriers 250a and 250b extend generally in the y-z plane. Each compartment 224a, 224b, 224c encloses an electrical apparatus, such as the electrical apparatus 110 (FIGS. 1A and 1C). Each of the enclosed electrical apparatus may be used to control and/or monitor the flow of electricity in a particular phase of the power system 100.

The assembly 220 is a three-dimensional body formed by a housing 222. The housing 222 has six exterior sides, including a front side 225b. Observation ports 226a, 226b, 226c pass through the front side 225b of the housing to the compartments 224a, 224b, 224c, respectively. The observation ports 226a, 226b, 226c are laterally displaced from each other along the X direction. Each of the observation ports 226a, 226b, 226c is positioned to be aligned with a respective compartment 224a, 224b, 224c. Thus, the status of the electrical apparatus in any of the compartments 224a, 224b, 224c may be observed through the respective observation port 226a, 226b, 226c.

Figure 2B:
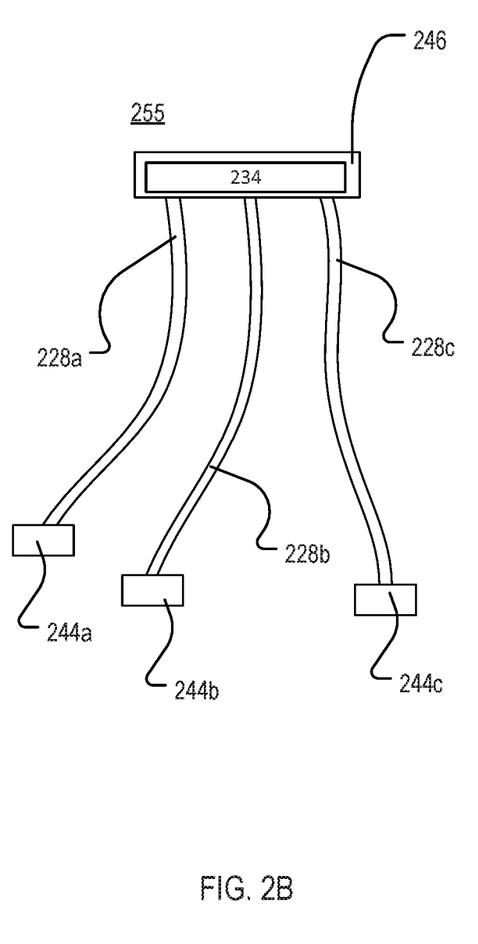
FIG. 2B is a block diagram of an example of an optical guide assembly.

Referring also to FIG. 2B, the assembly 220 includes an optical guide assembly 255. The optical guide assembly 255 is similar to the optical guide assembly 155 (FIG. 1D), except the optical guide assembly 255 includes three optical guides 228a, 228b, 228c that deliver light to the respective compartments 224a, 224b, 224c. The optical guides 228a, 228b, 228c are mounted to a mounting device 246, and all of the optical guides 228a, 228b, 228c receive light from a single light source 234. Each optical guide 228a, 228b, 228c is sealed to a respective sealing member 244a, 244b, 244c in a manner similar to that discussed with respect to FIG. 1D. All of the optical guides 228a, 228b, 228c may be the same length, or the optical guides 228a, 228b, 228c may have different lengths. For example, the optical guide 228a may be 14 inches (35.56 centimeters) in length, the optical guide 228b may be 11 inches (27.94 centimeters) in length, and the optical guide 228c may be 8 inches (20.32 centimeters) in length.

The light source 234 is mounted at the front 225b at an illumination port 227. The assembly 220 also includes a control panel 240 and a light controller 242, which is accessible from the exterior of the assembly 220 and allows an operator to control an amount of light emitted by the light source 234. Although FIG. 2A shows the light source 234 as being part of the control panel 240, similar to the example discussed with respect to FIG. 1A, the illumination port 227 is substantially free of baffles and other light barriers, and an ambient light beam may be used as the light source 234. Moreover, in some implementations, the light source 234 is separate and distinct from the control panel 240.

Figure 3A:
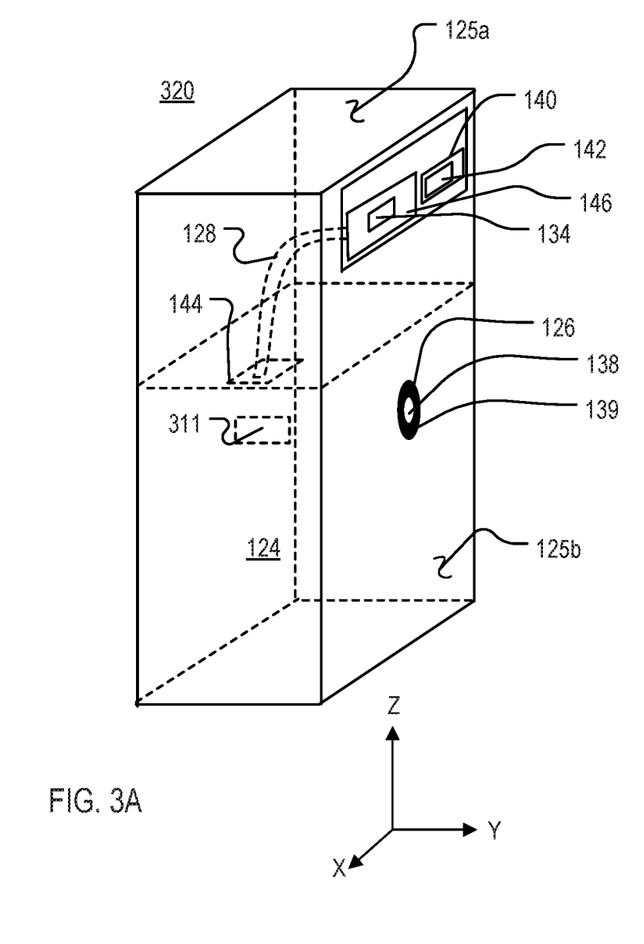
FIG. 3A is a perspective view of another example of an assembly that encloses an electrical connection mechanism.

FIG. 3A is a perspective view of an assembly 320. In FIG. 3A, dashed lines illustrate elements that are within the assembly 320.

Figure 3B:
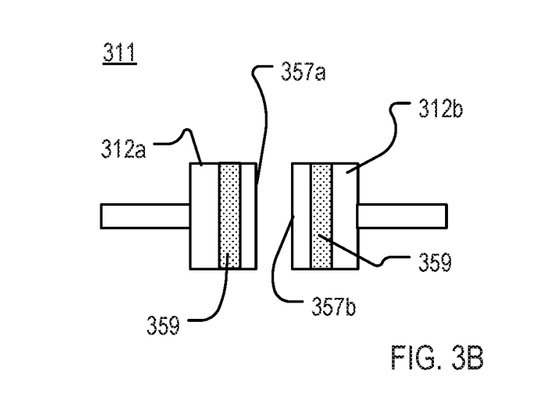
FIGS. 3B and 3C are block diagrams of an example of an electrical connection mechanism that may be used in the assembly of FIG. 3A.
Figure 3C:
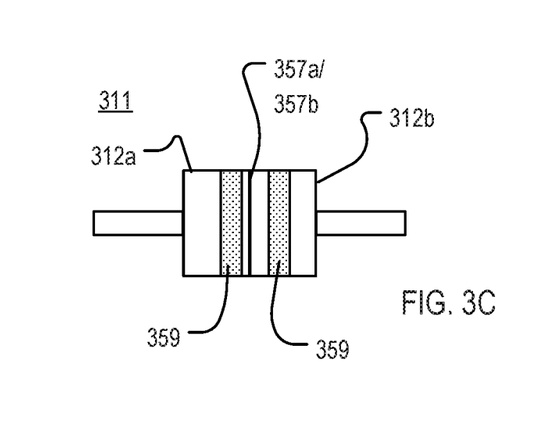

The assembly 320 is another example implementation of the assembly 120 (FIGS. 1A and 1C). The assembly 320 may be used in the electrical power system 100 (FIG. 1A). The assembly 320 is the same as the assembly 120. However, in the example of FIG. 3A, an electrical connection mechanism 311 of the electrical apparatus enclosed in the interior space 124 includes a light-enhancing material 359. The light-enhancing material 359 is shown in FIGS. 3B and 3C with a dotted shading pattern.

The mechanism 311 includes contacts 312a and 312b. The contact 312b moves relative to the contact 312a to separate the contacts 312a and 312b (FIG. 3B) and to join the contacts 312a and 312b (FIG. 3C). The contact 312a includes a contact surface 357a, and the contact 312b includes a contact surface 357b. The contact surfaces 357a and 357b are made from an electrically conductive material such that, when the contact surfaces 357a and 357b touch (such as in FIG. 3C), electricity is able to flow between the contacts 312a and 312b. The light-enhancing material 359 is placed on an exterior of the contacts 312a and 312b away from the respective contact surfaces 357a and 357b. In this way, the light-enhancing material 359 does not interfere with the operation of the contacts 312a and 312b but may still be observed through the observation port 126.

The light-enhancing material 359 is any material that has a visible characteristic that is enhanced in response to receiving light from the light source 134. For example, the light-enhancing material 359 may be an edge-emitting plastic material that emits light while being illuminated by light from the light source 134. The edge-emitting plastic material may be any translucent or transparent plastic material. For example, the edge-emitting plastic material may be acrylic. In another example, the light-enhancing material 359 may be a material that reflects light from the light source 134. In yet another example, the light-enhancing material 359 may be a block of color that contrasts with the surrounding area. In these implementations, the observer views the mechanism 311 through the observation port 126 while illuminating the interior space 124 with light from the light source 134.

In other implementations, the light-enhancing material 359 is a light-emitting material that produces light even after the light source 134 stops producing light. For example, the material 359 may be a material that glows or otherwise emits light in response to receiving light from the light source 134, such as a fluorescent or phosphorescent material, and continues to emit light for a finite amount of time after the illumination from the light source 134 ceases. In these implementations, the observer may view the mechanism through the observation port 126 while illuminating the interior space 124 with the light source 134 or after the light source 134 is no longer illuminating the interior space 124.

Figure 4B:
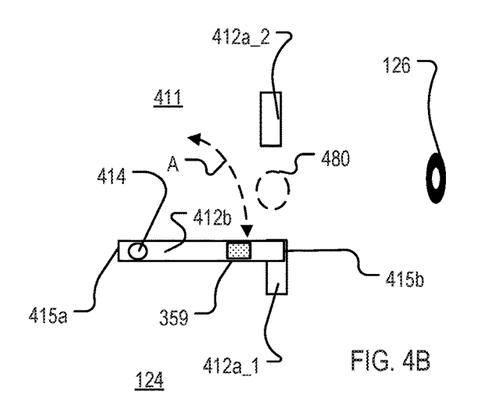
FIGS. 4B-4D are block diagrams of an example of an electrical connection mechanism that may be used in the assembly of FIG. 4A.
Figure 4C:
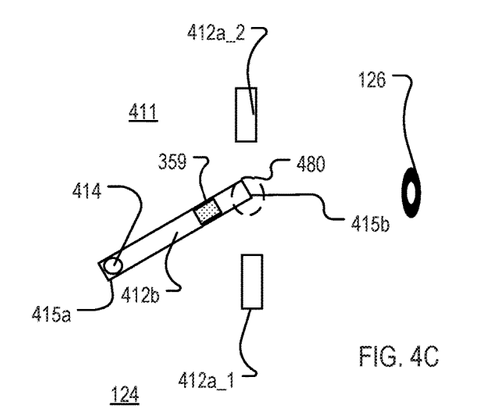
Figure 4D:
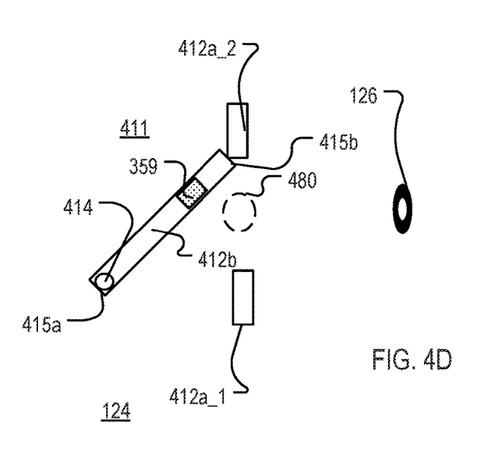

FIG. 4A is a side cross-sectional block diagram of an assembly 420 in the Y-Z plane. The assembly 420 is another example of an implementation of the assembly 120 (FIG. 1A). The assembly 420 may be used in the power system 100. The assembly 420 includes an electrical connection mechanism 411 that includes the light-enhancing material 359 in the interior space 124. FIGS. 4B-4D are block diagrams of the electrical connection mechanism 411.

The assembly 420 is mounted on a mounting block 470. The mounting block 470 is any structure that is capable of supporting the assembly 420. For example, the mounting block 470 may be a poured concrete slab that is on the ground. The mounting block 470 may have a space for human operator to stand while viewing the interior space 124 through the observation port 126.

The distribution path 104 connects to the assembly 420 at an electrical cable connector 473. A conductor 474 carries electricity from the connector 473 to a circuit breaking mechanism 471. The circuit breaking mechanism 471 may be, for example, a vacuum interrupter. The circuit breaking mechanism 471 includes a stationary contact 472a and a movable contact 472b. The movable contact 472b moves toward and away from the stationary contact 472a by actuation of a rod 479. The actuation of the rod 479 is controlled by the driving mechanism 113. When the movable contact 472b and the stationary contact 472a are connected (as shown in FIG. 4A), electricity from the conductor 474 flows through the circuit breaking mechanism 471. When the movable contact 472b and the stationary contact 472a are separated, electricity does not flow through the circuit breaking mechanism 471.

Referring also to FIGS. 4B-4D, which are partial side views of the interior space 124 of the assembly 420 and show the electrical connection mechanism 411 in the Y-Z plane, the electrical connection mechanism 411 is a knife switch. The electrical connection mechanism 411 includes a first stationary contact 412a_1, a second stationary contact 412a_2, and a moving contact 412b. Each of the first stationary contact 412a_1, the second stationary contact 412a_2, and the moving contact 412b is made of an electrically conductive material, such as, for example, a metallic material. Thus, connecting the moving contact 412b to either the first stationary contact 412a_1 or the second stationary contact 412a_2 makes an electrical connection between that stationary contact and the moving contact 412b. In the example of FIGS. 4A-4D, the moving contact 412b is a substantially blade shaped structure. The first stationary contact 412a_1 is mounted to a support 475. The second stationary contact 412a_2 is mounted to the barrier 137.

As shown in FIG. 4B, the moving contact 412b extends from an end 415a to an end 415b. The moving contact 412b is secured at a pivot point 414, which is near the end 415a, and rotates through an arc A (FIG. 4A) about the pivot point 414. The arc A is not a physical structure in the interior space 124. The moving contact 412b is moved along the arc A by actuating a driving rod 478. The actuation of the driving rod 478 is controlled by the driving apparatus 113.

The circuit breaking mechanism 471 in the example of FIG. 4A is electrically connected to the moving contact 412b via an electrically conductive connection 477. In the example of FIG. 4A, the electrically conductive connection 477 is a sliding connection. The connection 477 allows the moving contact 412b to remain electrically connected to the circuit breaking mechanism 471 regardless of whether the contacts 472a and 472b are connected or disconnected.

The electrical connection mechanism 411 has three possible statuses: (1) a service status, (2) an off or isolated status, and (3) a grounded status. The status of the electrical connection mechanism 411 is determined by the position of the moving contact 412b. FIGS. 4A and 4B show the electrical connection mechanism 411 in the service status. In the service status, the moving contact 412b is connected to the first stationary contact 412a_1. When the contacts 472a and 472b of the circuit breaking mechanism 471 are connected, electricity flows in the moving contact 412b and is delivered to a load that is electrically connected to the moving contact 412b. FIG. 4C shows the electrical connection mechanism 411 in the off or isolated status. When the electrical connection mechanism 411 is in the off status, the moving contact 412b is not electrically connected to either the first stationary contact 412a_1 or the second stationary contact 412a_2. Electricity is not able to flow from the distribution path 104 into the moving contact 412b and the moving contact 412b is also not connected to ground. FIG. 4D shows the electrical connection mechanism 411 in the grounded status. When the electrical connection mechanism 411 is in the grounded status, the moving contact 412b is connected to the second stationary contact 412a_2 and the moving contact 412b is grounded.

In the example shown in FIGS. 4A-4D, the light-enhancing material 359 is on a portion of the moving contact 412b that is near the end 415b. Of the regions on the moving contact 412b, the end 415b moves through the largest distance in the interior space 124. Thus, placing the light-enhancing material 359 relatively near the end 415b aids an observer in discerning among the various positions of the moving contact 412b. However, the light-enhancing material 359 is not on the portion of the moving contact 412b that makes contact with the stationary contacts 412a_1, 412a_2. By placing the light-enhancing material 359 on a portion other than the portion of the moving contact 412b that connects to the stationary contacts 412a_1, 412a_2, the light-enhancing material 359 does not interfere with the operation of the electrical connection mechanism 411.

When the moving contact 412b is in contact with the first stationary contact 412a_1 (FIGS. 4A and 4B), the end 415b of the moving contact 412b is at the bottom of the arc A and the light enhancing material 359 is nearer the bottom of the interior space 124. When the electrical connection mechanism 411 is in the isolated position (FIG. 4C), the end 415b of the moving contact 412b is at a location 480 between the top and bottom of the arc A and, as compared to when the electrical connection mechanism 411 is in the service position (FIGS. 4A and 4B), the light enhancing material 359 is not as close to the bottom of the interior space 124. When the electrical connection mechanism 411 is in the grounded position (FIG. 4D), the moving contact 412b is at the top of the arc A, and the light enhancing material 359 is higher in the space 124 as compared to when the electrical connection mechanism 411 is in the service position or the isolated position.

The interior space 124 is illuminated by light delivered through the optical guide 128 (FIG. 4A). As discussed above, the light-enhancing material 359 has a visible characteristic that is enhanced in response to receiving light from the light source 134. Thus, when an observer views the interior 124 through the observation port 126, the light-enhancing material 359 is more visually prominent than other items in the interior space 124 and can be easily seen by the observer. For example, the light-enhancing material 359 may be an optically reflective material that reflects light delivered by the optical guide 128. Thus, by delivering light into the interior space 124, the observer is able to discern the position of the moving contact 412b and is able to determine the state of the electrical connection mechanism 411 by looking through the observation port 126.

The arrangement of the light-enhancing material 359 shown in FIGS. 4A-4D is provided as an example, and other arrangements are possible. For example, the light-enhancing material 359 may be placed on the first stationary contact 412a_1 and/or the second stationary contact 412a_2 in addition to being on the moving contact 412b. In one example, the light-enhancing material 359 is on both the first stationary contact 412*a*_1 and second stationary contact 412*a*_2, and the light-enhancing material 359 that is on each of the first stationary contact 412*a*_1, the second stationary contact 412*a*_2, and the moving contact 412*b* has a different visible characteristic. For example, the light-enhancing material 359 on the first stationary contact 412*a*_1 may be a red reflective material, the light-enhancing material 359 on the second stationary contact 414*a*_2 may be a yellow reflective material, and the light-enhancing material 359 on the moving contact 412*b* may be an orange reflective material. In this way, an observer will see a red reflective material next to an orange reflective material when the electrical connection mechanism 411 is in the service position. The observer will see a yellow reflective material next to an orange reflective material when the electrical connection mechanism 411D is in the grounded position (as shown in FIG. 4D).

In some implementations, the light-enhancing material 359 is not on the moving contact 412*b* and is instead only on the stationary contacts 412*a*_1, 412*a*_2, and on a portion of an interior wall 421 that is aligned with the location 480 (which is the location of the moving contact 412*b* when the electrical connection mechanism 411 has the off or isolated status).

Furthermore, the light-enhancing material 359 may be distinguishable on the basis of a characteristic other than or in addition to color, such as lettering that relates to the location of the light-enhancing material 359. For example, the light-enhancing material 359 may be placed on a portion of the interior wall 421 that is aligned with the position of the moving contact 412*b* when the electrical connection mechanism 411 is in the isolated position. In these implementations, the light-enhancing material 359 may be a reflective material that spells out "OFF" or an edge-emitting plastic material that includes the word "OFF" etched on an emitting edge. In this way, the operator is able to visually observe when the moving contact 412*b* is in the position that corresponds with the electrical connection 411 being in the isolated position.

In the example of FIGS. 4A-4D, the arc A along which the movable contact 412*b* travels is an arc in the Y-Z plane. However, other implementations are possible. For example, the movable contact 412*b* may move in an arc that is in the X-Y plane, and the first and second stationary contacts 412*a*_1, 412*a*_2 may be separated from each other along the X direction.

Figure 5A:
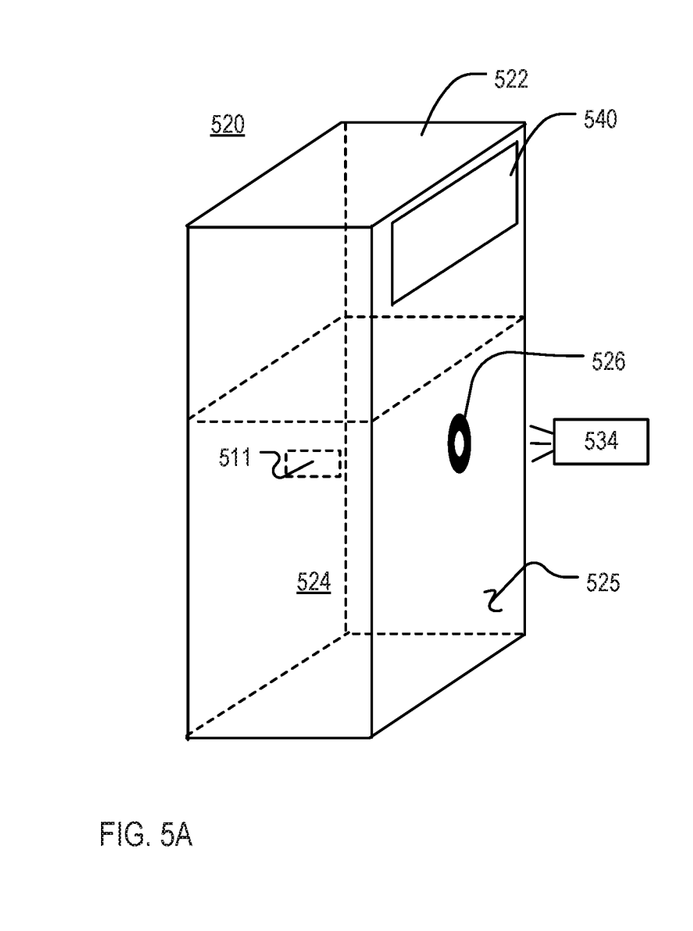
FIG. 5A is a perspective view of another example of an assembly that encloses an electrical connection mechanism.
Figure 5B:
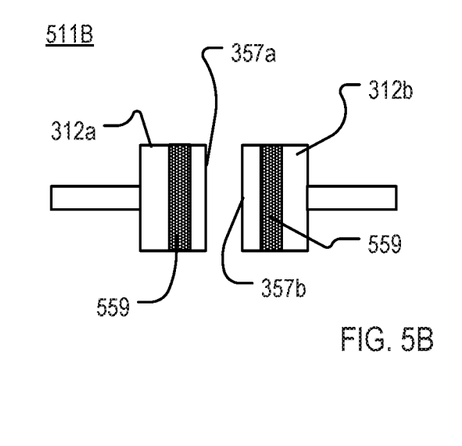
FIGS. 5B and 5C are block diagrams of an example of an electrical connection mechanism that may be used in the assembly of FIG. 5A.
Figure 5C:
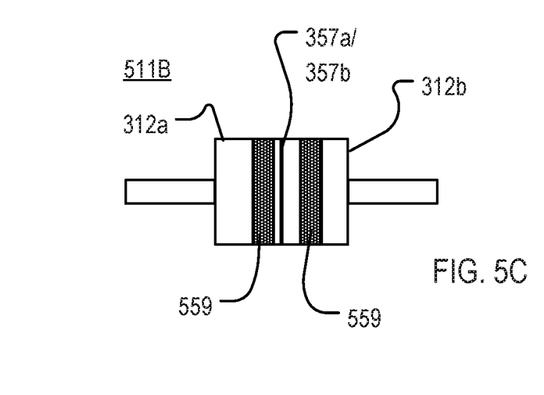

Referring to FIG. 5A, a perspective view of another assembly 520 is shown. In FIG. 5A, dashed lines illustrate elements that are within the assembly 520. FIGS. 5B and 5C are block diagrams of a mechanism 511 that is part of an electrical apparatus that is enclosed in the assembly 520. The assembly 520 may be used in the electrical power system 100 (FIG. 1A).

The assembly 520 includes a housing 522 with six exterior surfaces, including a front surface 525. An observation port 526 is formed at the front surface 525. The observation port 526 is similar to the observation port 126 (FIGS. 1A and 1C). The observation port 526 allows an observer to view an interior space 524 that is enclosed in the assembly 520. FIGS. 5B and 5C are block diagrams of the mechanism 511. The mechanism 511 is the same as the mechanism 311 (FIGS. 3B and 3C), except the mechanism 511 includes a light-emitting material 559. The light-emitting material 559 is a material that glows or otherwise emits light in response to receiving light from a light source 534. For example, the light-emitting material 559 may be a fluorescent or phosphorescent material. In the implementation shown in FIG. 5A, the light source 534 is separate from the assembly 520, and the light source 534 is used to shine light through the observation port 526. The light source 534 may be, for example, a flashlight, headlamp, or other light source that is held by a user. After directing the light from the light source 534 through the observation port 526 and into the interior space 524, the user removes the light source 534 and observes the interior space 524.

FIGS. 5B and 5C are block diagrams of a mechanism 511B, which is an example of the mechanism 511. The mechanism 511B is the same as the mechanism 311 (FIGS. 3B and 3C), except the mechanism 511B includes the light-emitting material 559 on the contacts 312*a* and 312*b*. The presence of the light-emitting material 559 makes it possible for the user to use the observation port 526 for both illumination and observation.

Figure 5D:
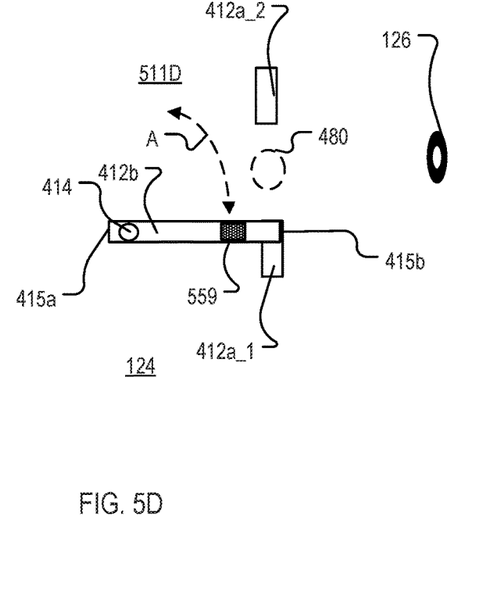
FIGS. 5D-5F are block diagrams of another example of an electrical connection mechanism that may be used in the assembly of FIG. 5A.
Figure 5E:
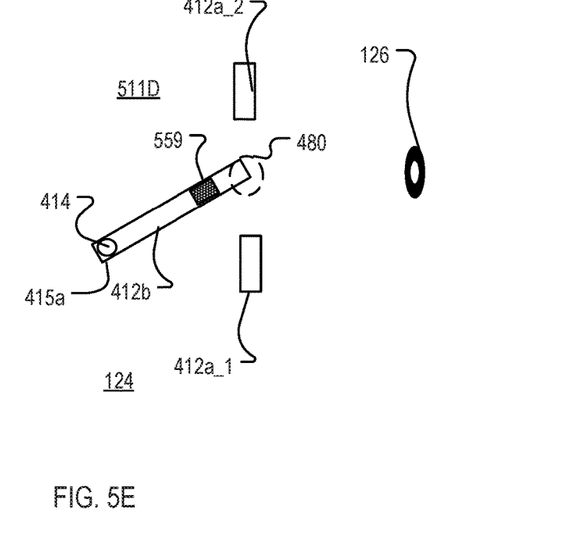
Figure 5F:
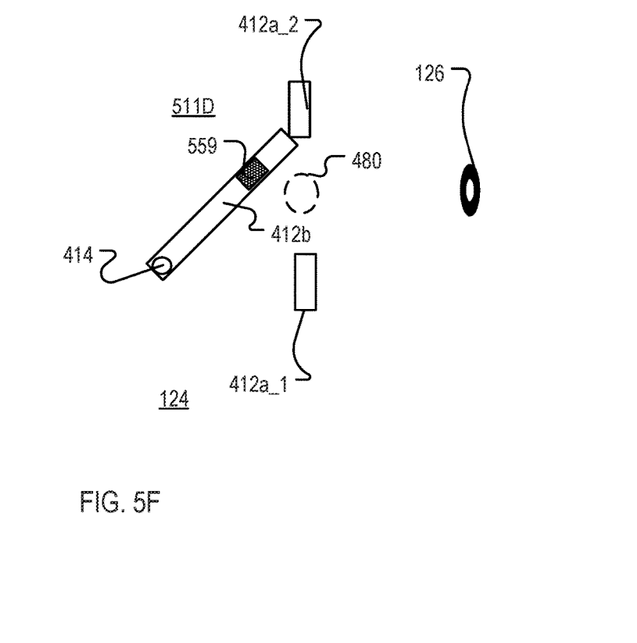

The assembly 520 also includes a control panel 540. The control panel 540 includes various controls related to the assembly 520, but the control panel does not include a light source or a control for a light source. FIGS. 5D-5F are block diagrams of a mechanism 511D, which is another example of the mechanism 511. The mechanism 511D is the same as the mechanism 411 (FIGS. 4A-4D), except the mechanism 511D includes the light-emitting material 559. Thus, the user is able to use the observation port 526 for both illumination and observation.

Other implementations are within the scope of the claims. For example, other items may be located on the front 125*b* or the front 225*b*. For example, the front 125*b* may include a receptacle (such as, for example, the cable connector 473 of FIG. 4A) that receives a cable that brings electricity into the assembly 120 from the distribution path 104. In another example, the implementation of FIG. 2A may use the light-enhancing material 359 or the light-emitting material 559 on the contacts of the electrical apparatus in one or more of the compartments 224*a*, 224*b*, 224*c*. The optical guide assembly 255 (FIG. 2B) may include more than one light source and may include one light source for each of the optical guides 228*a*-228*c*. The optical guide assembly 255 discussed above includes three optical guides 228*a*-228*c*. However, the optical guide assembly 225 may include fewer or more optical guides.

Figure 6:
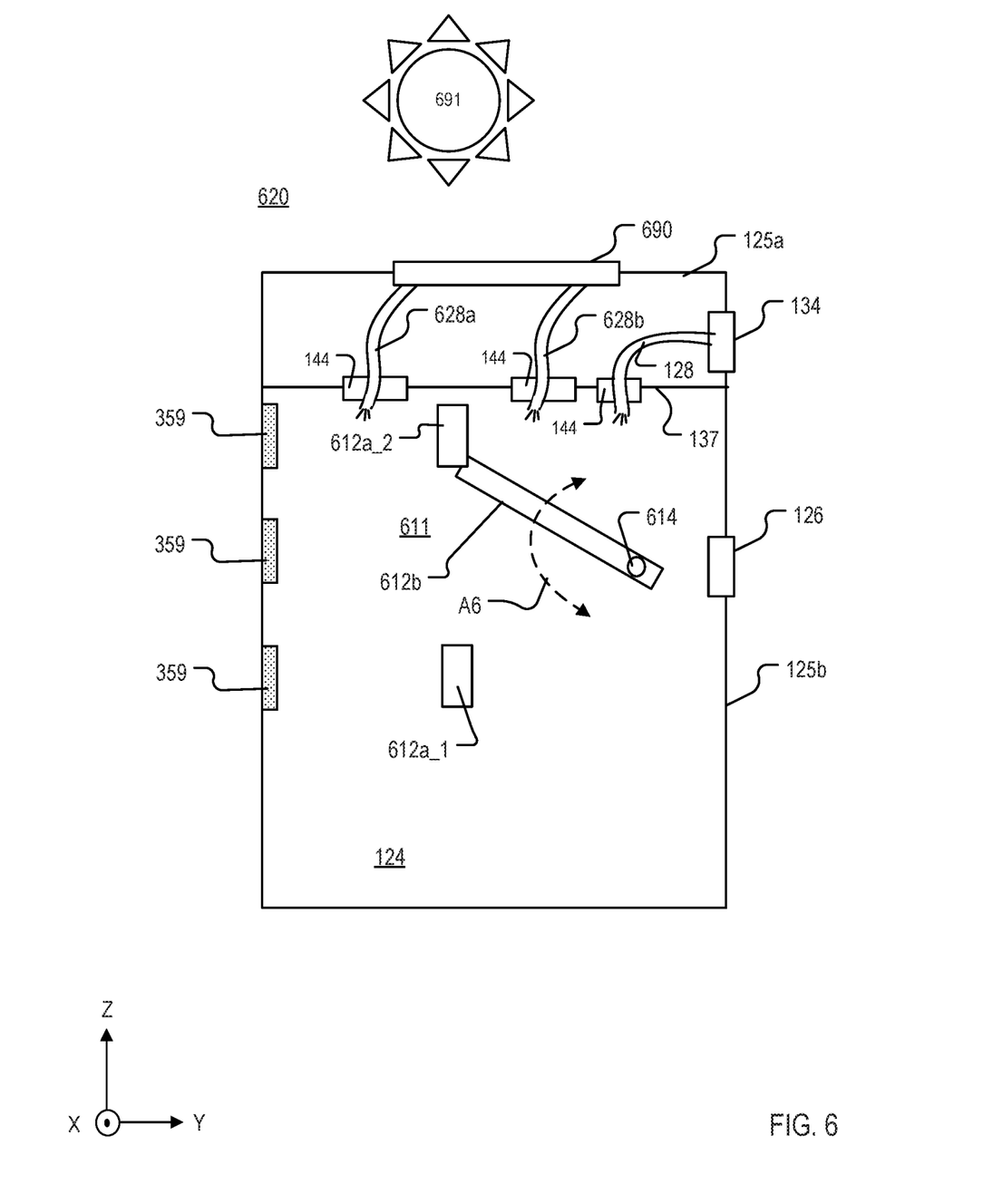
FIG. 6 is a side view of another example of an assembly that encloses an electrical connection mechanism.

Furthermore, additional light sources may be used in any of the assemblies 120, 220, 320, 420, and 520. For example and referring to FIG. 6, any of the assemblies 120, 220, 320, 420, and 520 may include a skylight that is positioned to allow ambient light into the interior space 124. FIG. 6 is a side block diagram of an assembly 620. The assembly 620 is another example implementation of the assembly 120. The assembly 620 includes a skylight 690 that is formed in the side 125*a*. The skylight 690 is positioned to receive ambient light from a source such as a sun 691. The skylight 690 may be formed from any material that is able to transmit light. For example, the skylight 690 may be a transmissive or translucent polymer material or glass. The skylight 690 is sealed to the side 125*a* to prevent moisture and debris from entering the interior 124.

Optical guides 628*a* and 628*b* carry light from the skylight 690 into the interior 124. In the example of FIG. 6, the assembly 620 also includes the optical guide 128, which carries light from the light source 134 into the interior 124. The optical guides 128, 628*a*, and 628*b* are optical guides that are configured to transport light from the exterior of the assembly 620, through the opaque barrier 137, and into the interior 124 of the assembly 620. The optical guides 628*a* and 628*b* may be, for example, optical conduits, one or more optical fibers, or a series of reflective elements arranged to direct light from the skylight 690 into the interior 124.

The assembly 620 includes an electrical connection mechanism 611 in the interior 124. The electrical connection mechanism 611 includes a first stationary contact 6110, a second stationary contact 612a_2, and a moving contact 612b. The moving contact 612b is secured at a pivot point 614 and moves along an arc A6 about the pivot point 614. The electrical connection mechanism 611 is similar to the electrical connection mechanism 411 (FIGS. 4A-4D). The skylight 690 allows light into the interior 124 such that the ambient light illuminates the light-enhancing material 359. In the example shown in FIG. 6, the light-enhancing material 359 is on an interior wall of the assembly 620 and aligned with the positions that the moving contact 612b has in the service, isolated, and grounded positions. However, alternatively or additionally, the light-enhancing material 359 may be on the moving contact 612b, the first stationary contact 612a_1, and/or the second stationary contact 612a_2.

In the example shown in FIG. 6, the light source 134 provides light that is carried into the interior 124 by the optical guide 128, and the sun 691 provides light that is carried into the interior by the optical guides 628a and 628b. However, in other implementations, the skylight 690 and the optical guides 628a and 628b are used without the light source 134 and the optical guide 128. In these implementations, the ambient light from the sun 691 (or another ambient source) is the external light source that is used to illuminate the interior 124. Moreover, although the example of FIG. 6 shows two optical guides extending from the skylight 690, more or fewer optical guides may carry light from the skylight 690 to the interior 124.

What is claimed is:

1. An assembly for use in an electrical power distribution system, the assembly comprising:
    a housing comprising an interior space;
    an electrical apparatus in the interior space, the electrical apparatus comprising an electrical connection mechanism that is configured to move between at least two positions;
    an illumination port on the housing;
    an observation port through the housing, the observation port being configured to allow visual observation of the electrical connection mechanism in the interior space from an exterior of the housing; and
    an optical guide in the housing, wherein the optical guide is configured to receive light from the illumination port, and the optical guide is configured to deliver light from the illumination port to the interior space to thereby illuminate the electrical connection mechanism.

2. The assembly of claim 1, further comprising a control panel comprising a control switch configured to control an amount of light emitted from a light source that is coupled to the illumination port.

3. The assembly of claim 2, wherein the control panel is at the exterior of the housing.

4. The assembly of claim 2, wherein the housing comprises one or more additional interior spaces.

5. The assembly of claim 1, wherein the illumination port is configured to receive light from a light source that is separate and distinct from the assembly.

6. The assembly of claim 5, wherein the separate and distinct light source comprises a light source configured to be manipulated by a human operator.

7. The assembly of claim 1, wherein an exterior of the electrical connection mechanism comprises a material that emits light in response to receiving light from the optical guide.

8. The assembly of claim 7, wherein the material comprises an edge-emitting material.

9. The assembly of claim 1, wherein the electrical connection mechanism comprises at least two electrical contacts, the at least two electrical contacts comprising a movable contact and a stationary contact.

10. The assembly of claim 9, wherein the electrical connection mechanism comprises at least a first stationary contact and a second stationary contact, the movable contact is configured to move between the first stationary contact and the second stationary contact, and one of the first stationary contact or the second stationary contact comprises a service contact and the other of the first stationary contact or the second stationary contact comprises a ground contact.

11. The assembly of claim 1, wherein the housing encloses a solid dielectric switchgear.

12. The assembly of claim 1, wherein the optical guide comprises an optical fiber or a flexible pipe configured to pass light through an interior region of the optical fiber or flexible pipe.

13. The assembly of claim 1, wherein the optical guide comprises a rigid structure that defines an open region configured to pass light.

14. The assembly of claim 1, further comprising a barrier that separates the interior space from an interior compartment, and wherein the optical guide is in the interior compartment, and the optical guide is sealed to the barrier.

15. The assembly of claim 1, wherein the illumination port is in a top region of the housing.

16. An assembly for use in an electrical power distribution system, the assembly comprising:
    a housing comprising an interior space;
    an electrical apparatus in the interior space, the electrical apparatus comprising an electrical connection mechanism configured to move between at least two positions; and
    an observation port through the housing, the observation port being configured to allow visual observation of the electrical connection mechanism in the interior space from an exterior of the housing, wherein an exterior surface of the electrical connection mechanism comprises a light-emitting material that emits light in response to receiving light from a light source and continues to emit light for a finite amount of time after receiving light from the light source while the light from the light source is not illuminating the material.

17. The assembly of claim 16, further comprising an illumination port through the housing, wherein the illumination port is separate from the observation port, and the illumination port is configured to deliver light from the light source into the interior space.

18. The assembly of claim 16, wherein the light-emitting material comprises a fluorescent or phosphorescent material.

19. An assembly for use in an electrical power distribution system, the assembly comprising:
    a housing comprising a plurality of distinct interior spaces;
    an electrical apparatus in each of the distinct interior spaces, the electrical apparatus comprising an electrical connection mechanism configured to move between at least two positions;
    an illumination port through the housing;

an optical guide assembly mounted in the illumination port, the optical guide assembly comprising: a plurality of optical guides that each extend away from the optical guide assembly and into a different one of the distinct interior spaces in the housing, each optical guide comprising a first end and a second end, the first end of each of the optical guides being configured to receive light from the illumination port and the second end of the optical guide being configured to deliver at least some of the received light to one of the distinct interior spaces; and a plurality of observation ports through the housing, each of the plurality of observation ports being configured to allow visual observation of the electrical connection mechanism in one of the plurality of distinct interior spaces from an exterior of the housing, wherein the observation ports are physically separate from the illumination port.

20. The assembly of claim 19, wherein an exterior surface of the electrical connection mechanism comprises a material that reflects or emits light in response to receiving light from a light source.

21. The assembly of claim 20, wherein the material comprises an edge-emitting material.

* * * * *